United States Patent [19]

Fleischer

[11] Patent Number: 4,503,088

[45] Date of Patent: * Mar. 5, 1985

[54] TREATMENT OF LITHIUM ANODES

[75] Inventor: Niles A. Fleischer, Madison, Wis.

[73] Assignee: Rayovac Corporation, Madison, Wis.

[*] Notice: The portion of the term of this patent subsequent to Sep. 6, 2000 has been disclaimed.

[21] Appl. No.: 506,633

[22] Filed: Jun. 22, 1983

Related U.S. Application Data

[63] Continuation-in-part of Ser. No. 343,490, Jan. 28, 1982, Pat. No. 4,402,995.

[51] Int. Cl.³ .......................... B05D 5/12; H01M 4/36
[52] U.S. Cl. .................................... 427/58; 427/126.1; 427/388.1; 429/101; 429/212
[58] Field of Search ................... 429/48, 101, 50, 218; 427/58, 126.1, 115

[56] References Cited

U.S. PATENT DOCUMENTS 4,296,185 10/1981 Catanzarite ........................ 429/48
4,402,995 9/1983 Fleischer ........................ 429/101 X Primary Examiner—Brian E. Hearn
Assistant Examiner—Stephen J. Kalafut
Attorney, Agent, or Firm—Kenyon & Kenyon

[57] ABSTRACT

A method for reducing passivation of a lithium electrode used in a cell having a thionyl chloride liquid cathode is disclosed, the method comprising providing on the surface of the electrode a polymer Film selected from the group of alkyl acrylate and alkyl substituted acrylate polymers, the Film containing a salt in the polymer matrix.

7 Claims, 2 Drawing Figures

FIG. 2 - COMPARISON OF THICK AND SALT ADDED CYANOACRYLATE ONE DAY IN ELECTROLYTE.

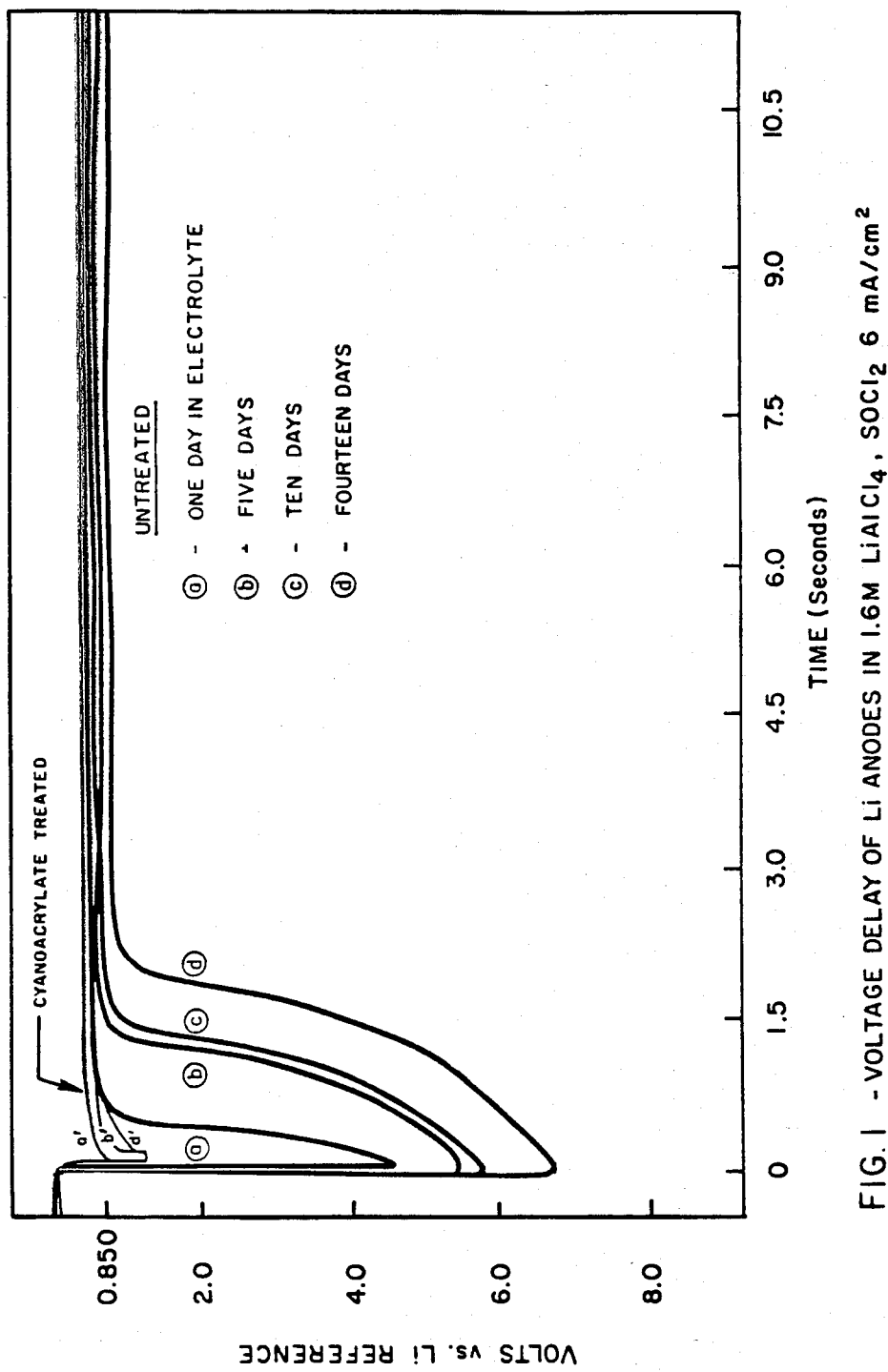
FIG. 1 — VOLTAGE DELAY OF Li ANODES IN 1.6M $LiAlCl_4$, $SOCl_2$ 6 mA/cm$^2$

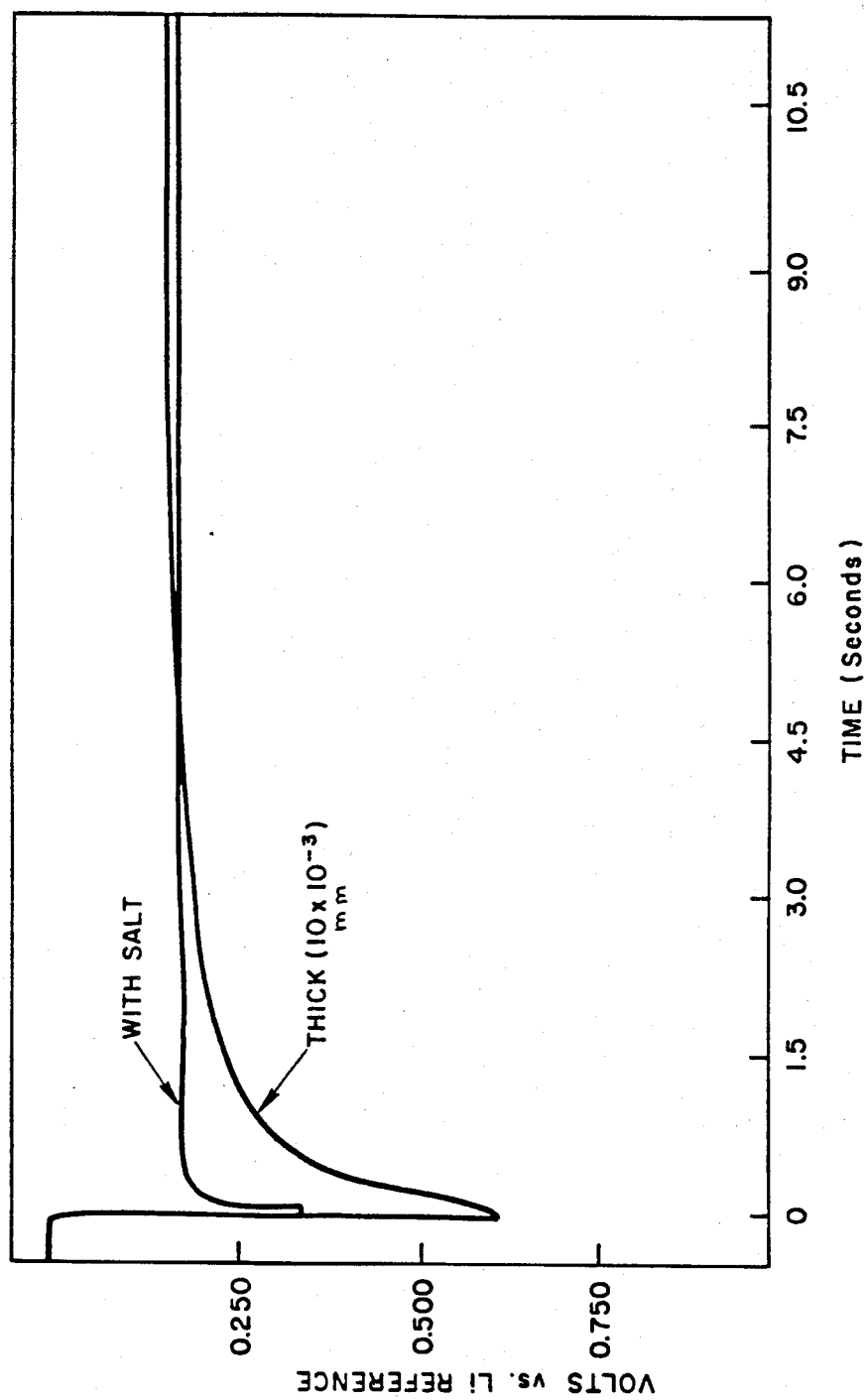
FIG. 2 - COMPARISON OF THICK AND SALT ADDED CYANOACRYLATE ONE DAY IN ELECTROLYTE.

TREATMENT OF LITHIUM ANODES

TECHNICAL FIELD

This application is a continuation in part of U.S. application Ser. No. 343,490 filed Jan. 28, 1982, now U.S. Pat. No. 4,402,995.

The present invention is directed to a method for reducing voltage delay encountered in, for example, lithium-thionyl chloride cells.

BACKGROUND OF THE INVENTION AND THE PRIOR ART

It is known in the art that electrochemical cells having an anode of lithium or other Group I metal have high energy densities, high voltages, wide temperature operating ranges, long shelf-life and relatively low cost.

In such cells, the type now commonly referred to as the "liquid cathode" cell are of particular interest. These cells are described, for example in U.S. Pat. No. 3,926,669 and in British Pat. No. 1,409,307. In accordance with the teachings of the aforementioned patents, the electrolyte comprises an oxyhalide, for example thionyl chloride.

One attractive system is provided through the use of thionyl chloride, a solute of lithium aluminum tetrachloride, a lithium anode and a cathode current collector, which may be for example compressed carbon black. Despite the numerous advantages envisioned for lithium liquid cathode batteries, it has been found that problems occur with these cells. A particular problem has been identified as that of voltage delay particularly occurring when the batteries are stored at elevated temperatures. The voltage delay problem is characterized by two features; to wit, a dip in voltage below a defined cutoff voltage and the time required for the voltage to rise back to the cutoff voltage. The problem is believed to result from passivation of the lithium anode due apparently to reactions between the lithium anode and constituents of the electrolyte.

In accordance with U.S. Pat. No. 4,170,693 it is proposed to minimize the voltage delay problem by coating the lithium anode with a cyanoacrylate polymeric coating.

The prior art is not clear as to the desirability of low reactivity between a protective coating and the lithium base. Rao, in U.S. Pat. No. 4,056,885, teaches that laminating (coating) lithium with aluminum results in a lithium-aluminum alloy due to the reactivity of aluminum with lithium. In U.S. Pat. No. 4,002,492 Rao also teaches that such a lithium-aluminum alloy has many desirable characteristics as use for anode materials. On the other hand, Catanzarite discloses that the material used in protective coatings of lithium should have low reactivity with the lithium base in U.S. Pat. No. 4,170,693. So on the point of reactivity between coatings and the lithium base the prior art teaches that beneficial effects can be obtained with either high or low reactivity coatings and so it is not a priori obvious as to which type of reactivity to choose for a protective coating for lithium.

The prior art is also not clear as to what the reactivity should be of materials added to electrolytes. Rao, in U.S. Pat. No. 4,002,492, teaches that an electrolyte salt considered for incorporation into the electrolyte should have low reactivity towards lithium. But Driscoll, in U.S. Pat. No. 4,093,784, teaches that it is desirable to place in the thionyl chloride electrolyte a calcium-containing salt in order that the lithium anode reacts with the calcium salt.

SUMMARY OF THE INVENTION

The invention is directed to an improvement in the reduction of voltage delay of a lithium oxyhalide cell wherein the lithium is provided with an acrylate ester or substituted acrylate ester polymer coating containing a salt in the polymer matrix. Generally this structure is obtained by coating the lithium with a solution of an acrylate or a cyanoacrylate ester or polymer thereof which solution contains a salt together with a non-aqueous solvent for the cyanoacrylate or acrylate (or polymer thereof) in which the salt is also soluble and evaporating said solvent under conditions to provide on the surface of said lithium anode an acrylate or cyanoacrylate polymer film containing said salts.

Polymer coatings incorporating a salt in their matrix are more beneficial in reducing voltage delay than plain polymer coatings because the salt affects the physical properties of the coating and affects the passivation of the lithium anode. While not wanting to be limited to a particular hypothesis, it appears that the salt incorporated in the polymer matrix plays a mechanical function in affecting the morphology and growth kinetics of the aforementioned passivating anode film.

DESCRIPTION OF THE DRAWING

FIG. 1 illustrates voltage delay curves determined on half cells using lithium anodes in a thionyl chloride solution of lithium aluminum tetrachloride after exposure of lithium to the electrolyte for various time periods and also includes curves showing the voltage delay resulting from cyanoacrylate treatments of the lithium.

FIG. 2 illustrates a comparison of the voltage delay curve of a lithium anode protected in accordance with the invention as compared to a prior art method.

DETAILED DESCRIPTION OF THE INVENTION

In accordance with the invention a lithium or lithium alloy anode is protected by a polymeric film preferably made by dissolving an alkyl 2 cyanoacrylate in a solvent and including in the mixture a salt which is soluble in the solvent, evaporating the solvent and allowing the cyanoacrylate to polymerize on the lithium anode surface. When the thus protected lithium anode surface comes in contact with thionyl chloride in the cell, it is believed that complex chemical reactions occur which result in at least removal of nitrogen from the polymer coating and the formation of an acrylate or a non-nitrile substituted acrylate polymer as the basis of the coating.

The preferred protective mixture provided in accordance with the invention comprises a solution of the cyanoacrylate ester with an effective amount of lithium perchlorate dissolved therein. The non-aqueous solvents which may be used in accordance with the invention include ethylacetate, dimethoxyethane and toluene. Lithium perchlorate may be present in the solution in a concentration of about 0.4 molar to saturation, e.g. about 3 molar. Preferably the ratio of cyanoacrylate to solvent is about 1:5 by volume. Volume ratios from 1:6 to 1:2 are operable. The polymeric solution may be applied to the lithium electrode by dipping, spraying, painting, etc. No surface preparation of the lithium is required and the solvent evaporates quickly, leaving behind a polymeric film of cyanoacrylate ester. Alternatively, the lithium can be coated with a similar solution containing in place of the cyanoacrylate ester, an equivalent amount of acrylate or non-nitrile substituted acrylate ester or polymer thereof.

In order to demonstrate the advantages resulting from the invention, a series of half cell tests were made in which a lithium anode was exposed to a thionyl chloride electrolyte containing lithium aluminum tetrachloride in a concentration of 1.6 molar. A constant current of 6 mA/cm$^2$ was applied to the anode and the change in the anode voltage was monitored over time against a lithium reference electrode. A voltage of 850 millivolts was used as a cutoff voltage.

In FIG. 1 of the drawing are shown the voltage curves obtained in the cases of lithium electrodes which were exposed 1 day, 5 days, 10 days and 14 days to the electrolyte. It is to be seen that the voltage delay of the untreated lithium anode became deeper and longer lasting as the exposure time to the electrolyte increased. The experiments were repeated using lithium anodes which were coated with cyanoacrylate dissolved at a 1:3 volume ratio in ethylacetate solvent. The voltage delay curves for these electrodes are also shown in FIG. 1 as curves a', b' and d'. It is to be seen that the voltage delay is greatly alleviated by the cyanoacrylate coating.

An electrode produced in accordance with the invention wherein the lithium was coated with a 1:3 cyanoacrylate/ethylacetate solution containing lithium perchlorate in a 1 molar concentration was also prepared and the voltage delay curve for this electrode is compared to the voltage delay curve for an electrode coated only with the cyanoacrylate film in FIG. 2. It is to be seen from FIG. 2 that the addition of the lithium perchlorate salt to the film produced the benefit of a lower voltage dip and a much quicker voltage recovery time. In this connection, the recovery time is defined as a time required for the voltage to reach a steady state level. The data comparing voltage delay for cyanoacrylate films without and with the lithium perchlorate addition are summarized in the following Table I:

TABLE I

|  | Voltage Dip | Improvement Over Preceding Method | Recovery Time Seconds |
|---|---|---|---|
| Not Coated | 1.695 V | — | — |
| Thin Coating (5 × 10$^3$ mm) | 1.020 | 40% | — |
| Thick Coating (10 × 10$^{-3}$ mm) | 0.625 | 39% | 20 |
| Thick Plus Salt | 0.370 | 41% | 0.5 |

In other half-cell testing in a thionyl chloride electrolyte with 1.6 molar LiAlCl$_4$ therein, it was observed that a 1:5 ratio of cyanoacrylate to ethyl acetate (EtOAc) solvent containing lithium perchlorate in 3 molar concentration (applied by dipping, 15-second immersion per dip) provided superior results as will be seen from the following Table II:

TABLE II

V$_{min}$ vs. Li Reference
Half-cell Data, 6 mA/cm$^2$ Pulse
Average Values of N Cells

| Coating Composition | Day 1 | Day 1 + 3 | N |
|---|---|---|---|
| 1:5, 3 M LiClO$_4$ | 0.308 | 0.500 | 3 |
| 1:3, 1 M LiClO$_4$ | 0.380 | 1.318 | 2 |
| 1:3, 3 M LiClO$_4$ | 0.475 | — | 3 |
| 1:3, 0.45 M LiClO$_4$ | 0.420 | 0.725 | 1 |
| 1:5, 3 M LiClO$_4$ two dips | 1.923 | — | 2 |

Coin cells having a rating of about 1.5 ampere hours produced using cyanoacrylate coated lithium electrodes with and without lithium perchlorate salt addition, a thionyl chloride electrolyte containing LiAlCl$_4$ and a porous carbon cathode collector also demonstrated an improvement in relation to voltage delay as shown in the following Table III:

TABLE III

VOLTAGE DELAY DATA/TIME
TO 2.7 v, SECONDS (50 Ohm LOAD)

| Storage Conditions | Anode Coatings 1 | 2 |
|---|---|---|
| Initial | 1.2 | 0.8 |
| 1 Day, 71° C. | <0.1 | <0.1 |
| 3 Days, 71° C. | 2.0 | 0.1 |
| 1 Week, 71° C. | 7.0 | 2.5 |
| 2 Weeks, 71° C. | >120 | >120 |
| 1 Week, 45° C. | 5.0 | 1 |
| 2 Weeks, 45° C. | 2.5 | 3 |

1: Two 15 sec. dips, EtOAc: CA, 3:1
2: Two 15 sec. dips, 1 M LiClO$_4$, EtOAc: CA, 3:1

Uncoated lithium anodes soaked in electrolyte saturated with LiClO$_4$ demonstrated an improvement in voltage delay as compared to similar anodes soaked in electrolyte to which no LiClO$_4$ had been added. It is also found that cyanoacrylate monomer is soluble in the electrolyte. Uncoated lithium anodes soaked in electrolyte containing dissolved monomer show an improvement in voltage delay but the monomer appears to react with the electrolyte and provides reduced efficacy over time.

The passivation effect on lithium electrodes appears to result from film formation on the lithium surface. The conditions leading to control of the passivating film are obscure, but it is postulated that weaker films have a lesser tendency to passivate.

Alkyl 2-cyanoacrylates are unsaturated monomeric esters which polymerize at room temperature without added catalysts and which are used as adhesives. Polymerization is usually initiated by moisture present in the atmosphere. The compounds are described in the *Encyclopedia of Polymer Science and Technology*, John Wiley and Sons, 1964, Vol. 1, at pages 337 to 342. The acrylate esters are described in the same volume on pages 246 to 328.

In assembling cells in accordance with the invention, the separator is also coated with a cyanoacrylate film.

Analytical techniques including X-ray Fluorescence and Infra-red spectroscopy have established that cyanoacrylate polymer films cast from lithium perchlorate/ethyl acetate solution are not changed in chemical structure as compared to similar cast films produced without LiClO$_4$ but that the salt is added to the polymer matrix. Additionally, the LiClO$_4$-doped polymer film is opaque while the undoped cyanoacrylate film is much more transparent.

It is found that LiClO$_4$ for use in accordance with the invention must be carefully dried to insure absence of water. Other salts (including, for purposes of definition of this term, oxides) which can be employed in place of lithium perchlorate are anhydrous aluminum halides such as $AlCl_3$, CaO, anhydrous calcium halides such as $CaCl_2$ and anhydrous lithium salts such as $Li_2CO_3$ and LiCl. In particular Atomic Adsorption analysis of a digested $AlCl_3$ doped polymer sample established the presence of the $AlCl_3$ salt in the polymer matrix.

Those skilled in the art will appreciate that the ambit of the claims appended hereto covers any method of providing a salt-doped polymer matrix on the lithium surface. In addition to the solution casting (painting) method described hereinbefore, the doped polymer film can be formed independantly and applied either alone or in association with a conventional separator to the lithium surface. Furthermore, salt need not be dissolved in the solvent as described but may be applied to the lithium surface as a dust either before or after solution coating so long as sufficient solvent is present or other means are provided to assure incorporation of the salt into the polymer matrix.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A method for reducing passivation of a lithium electrode used in a cell having a thionyl chloride liquid cathode comprising providing on the surface of said lithium electrode a polymer film selected from the group of alkyl acrylate and alkyl substituted acrylate polymers, said polymer film containing a salt in the polymer matrix.

2. A method as in claim 1 which comprises coating said lithium electrode before said cell is filled with electrolyte with a solution containing a non-aqueous solvent, a salt soluble in said non-aqueous solvent and a substance selected from the group of cyanoacrylate esters, acrylic esters and non-nitrile substituted acrylic esters and thereafter evaporating said solvent under conditions to provide on the surface of said lithium anode a polymer film containing said salt.

3. A method as in claim 2 wherein said solution contains a alkyl 2 cyanoacrylate.

4. A method as in claim 2 wherein said non-aqueous solvent is selected from the group of ethyl acetate, dimethoxyethane and toluene.

5. A method as in claim 2 wherein said salt is a lithium-containing salt.

6. A method as in claim 5 wherein said salt is lithium perchlorate.

7. A method in accordance with claim 6 wherein lithium perchlorate is present in said solution in an effective concentration up to about 3 molar.

* * * * *